(12) United States Patent
Malo et al.

(10) Patent No.: US 8,780,569 B2
(45) Date of Patent: Jul. 15, 2014

(54) ELECTRICAL ASSEMBLY HAVING IMPEDANCE CONTROLLED SIGNAL TRACES

(75) Inventors: Eric Gary Malo, Waterloo (CA); Cameron Russell Steeves, Waterloo (CA); Hassan Daniel Hosseinpor, Waterloo (CA)

(73) Assignee: BlackBerry Limited, Waterloo (CA)

( * ) Notice: Subject to any disclaimer, the term of this patent is extended or adjusted under 35 U.S.C. 154(b) by 92 days.

(21) Appl. No.: 13/569,541

(22) Filed: Aug. 8, 2012

(65) Prior Publication Data
US 2012/0300379 A1 Nov. 29, 2012

Related U.S. Application Data

(62) Division of application No. 12/609,144, filed on Oct. 30, 2009, now Pat. No. 8,264,848.

(51) Int. Cl.
*H05K 5/00* (2006.01)

(52) U.S. Cl.
USPC ........... 361/752; 361/761; 361/818; 174/254; 174/262; 174/372; 174/378; 174/520; 257/678; 257/704; 257/750; 349/58; 349/59; 349/150

(58) Field of Classification Search
USPC .......... 361/752, 761, 818; 174/254, 262, 372, 174/378, 520; 257/678, 704, 750; 349/58, 349/59, 150; 439/64, 108
See application file for complete search history.

(56) References Cited

U.S. PATENT DOCUMENTS

| | | | |
|---|---|---|---|
| 5,192,216 A | 3/1993 | Knauber et al. | |
| 5,355,105 A * | 10/1994 | Angelucci, Sr. ............... | 333/238 |
| 5,691,504 A | 11/1997 | Sands et al. | |
| 5,712,607 A | 1/1998 | Dittmer et al. | |
| 6,175,396 B1 | 1/2001 | Kim et al. | |
| 6,411,353 B1 * | 6/2002 | Yarita et al. ..................... | 349/59 |
| 6,573,600 B2 | 6/2003 | Kikuchi et al. | |
| 7,224,249 B2 | 5/2007 | van Quach et al. | |
| 7,345,632 B2 * | 3/2008 | Smith et al. ............ | 343/700 MS |
| 2001/0036145 A1 | 11/2001 | Otani et al. | |
| 2002/0118520 A1 | 8/2002 | Baker | |
| 2002/0126951 A1 | 9/2002 | Sutherland et al. | |
| 2002/0174998 A1 | 11/2002 | Takaoka | |
| 2002/0189854 A1 | 12/2002 | Crumly | |
| 2003/0137249 A1 | 7/2003 | Nakano et al. | |
| 2003/0198038 A1 | 10/2003 | Choi et al. | |
| 2004/0155819 A1 * | 8/2004 | Martin et al. .......... | 343/700 MS |
| 2005/0127232 A1 | 6/2005 | Moody et al. | |
| 2005/0185882 A1 | 8/2005 | Zack et al. | |

(Continued)

OTHER PUBLICATIONS

Byoung Nam Kim, Seong-Ook Park, Young-Sang Yoon, Jung-Keun Oh, and Gwan-Young Koo, A Wideband Built-in Antenna with Omni-Directional Radiation Pattern using Dual Radiators for Wireless Terminals, IEEE, APMC2005 Proceedings, 2005.

*Primary Examiner* — Xiaoliang Chen
(74) *Attorney, Agent, or Firm* — Ridout & Maybee LLP

(57) ABSTRACT

An electrical assembly having controlled impedance signal traces and a portable electronic device comprising an electrical assembly having controlled impedance signal traces are provided. In accordance with one embodiment, there is provided a portable electronic device, comprising an electrical assembly, comprising: a chassis made from a conductive material and forming a first ground plane; a first dielectric substrate layer overlaying the chassis; a first signal trace overlaying the first dielectric substrate layer; and a second dielectric layer overlaying the first signal trace.

13 Claims, 9 Drawing Sheets

(56) References Cited

U.S. PATENT DOCUMENTS

| | | |
|---|---|---|
| 2005/0253612 A1 | 11/2005 | Root et al. |
| 2006/0110949 A1 | 5/2006 | Jee et al. |
| 2007/0013052 A1 | 1/2007 | Zhe et al. |
| 2007/0066126 A1 | 3/2007 | Dutta et al. |
| 2007/0182512 A1 | 8/2007 | Lee et al. |
| 2007/0284129 A1 | 12/2007 | Monena |
| 2008/0024714 A1* | 1/2008 | Park .............................. 349/150 |
| 2008/0029295 A1 | 2/2008 | Brist et al. |
| 2008/0029296 A1 | 2/2008 | Brist et al. |
| 2008/0123016 A1 | 5/2008 | Kwak et al. |
| 2008/0204625 A1 | 8/2008 | Lee |
| 2009/0188712 A1 | 7/2009 | Clark et al. |
| 2009/0231238 A1 | 9/2009 | Fusayasu et al. |
| 2009/0237907 A1 | 9/2009 | Kunimoto et al. |
| 2010/0019366 A1 | 1/2010 | Rancuret et al. |
| 2010/0026927 A1 | 2/2010 | Jee et al. |
| 2010/0033641 A1 | 2/2010 | Ogasawara et al. |

* cited by examiner

ELECTRICAL ASSEMBLY HAVING IMPEDANCE CONTROLLED SIGNAL TRACES

RELATED APPLICATION DATA

The present application is a divisional application of U.S. patent application Ser. No. 12/609,144, filed Oct. 30, 2009, the content of which is incorporated herein by reference.

TECHNICAL FIELD

The present disclosure relates to the control of electrical impedances, and in particular to portable electronic devices comprising an electrical assembly having impedance controlled signal traces.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller and thinner portable electronic devices are generally desirable for portability. The number, type, location and mounting of the electronic components of portable electronic devices affect the size and profile (e.g., thickness) of portable electronic devices. Accordingly, device designs, configurations and features which provide smaller and thinner portable electronic devices are desirable.

DETAILED DESCRIPTION OF EXAMPLE EMBODIMENTS

Figure 1:
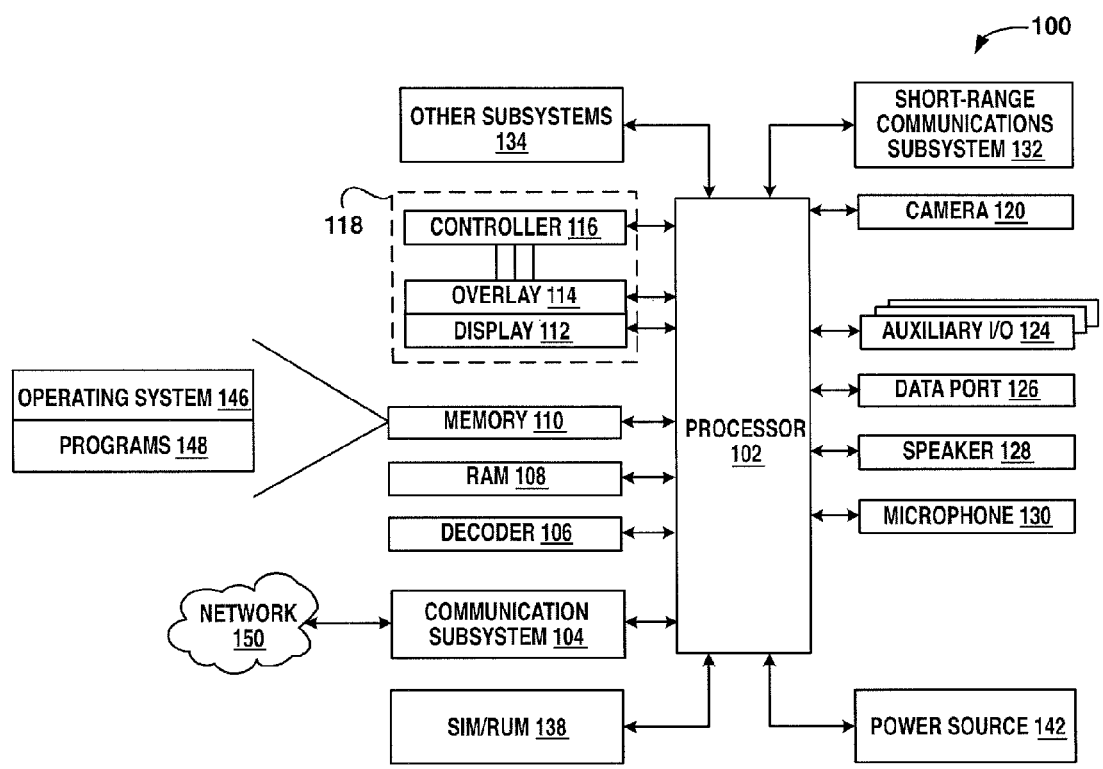
FIG. 1 is a simplified block diagram of components including internal components of a portable electronic device in accordance with one example embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In accordance with one embodiment of the present disclosure, there is provided an electrical assembly, comprising: a chassis for mounting electronic components, the chassis being made from a conductive material and forming a first ground plane; a first dielectric layer overlaying the chassis; a first signal trace overlaying the first dielectric layer; and a second dielectric layer overlaying the first signal trace.

In accordance with another embodiment of the present disclosure, there is provided a portable electronic device, comprising: an electrical assembly, comprising: a chassis made from a conductive material and forming a first ground plane; a dielectric substrate layer overlaying the chassis; and a first signal trace embedded within the dielectric substrate layer; a main circuit board mounted to the chassis and including multiple connectors for connecting electronic components, the main circuit board being connected to the first signal trace; a processor connected to the main circuit board; at least one input device connected to the main circuit board and to the processor through the main circuit board; and at least one output device connected to the main circuit board and to the processor through the main circuit board.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, a digital camera 120, one or more auxiliary input/output (I/O) subsystems 124, a data port 126, a speaker 128, a microphone 130, short-range communications subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on the portable electronic device, is displayed on the touch-sensitive display 118 via the processor 102.

The auxiliary I/O subsystems 124 may include one or more of the following input devices: one or more control keys, a keyboard, a keypad, or a navigation mechanism. The navigation mechanism may be a clickable/depressible trackball, a clickable/depressible scroll wheel, a touch-sensitive optical trackpad, or a touch-sensitive touchpad. The auxiliary I/O subsystems 124 may include one or more of the output devices to supplement the touch-sensitive display 118 and speaker 128 including, but not limited to, a notification light such as a light emitting diode (LED) or a vibrator or other mechanism for providing haptic/touch feedback.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
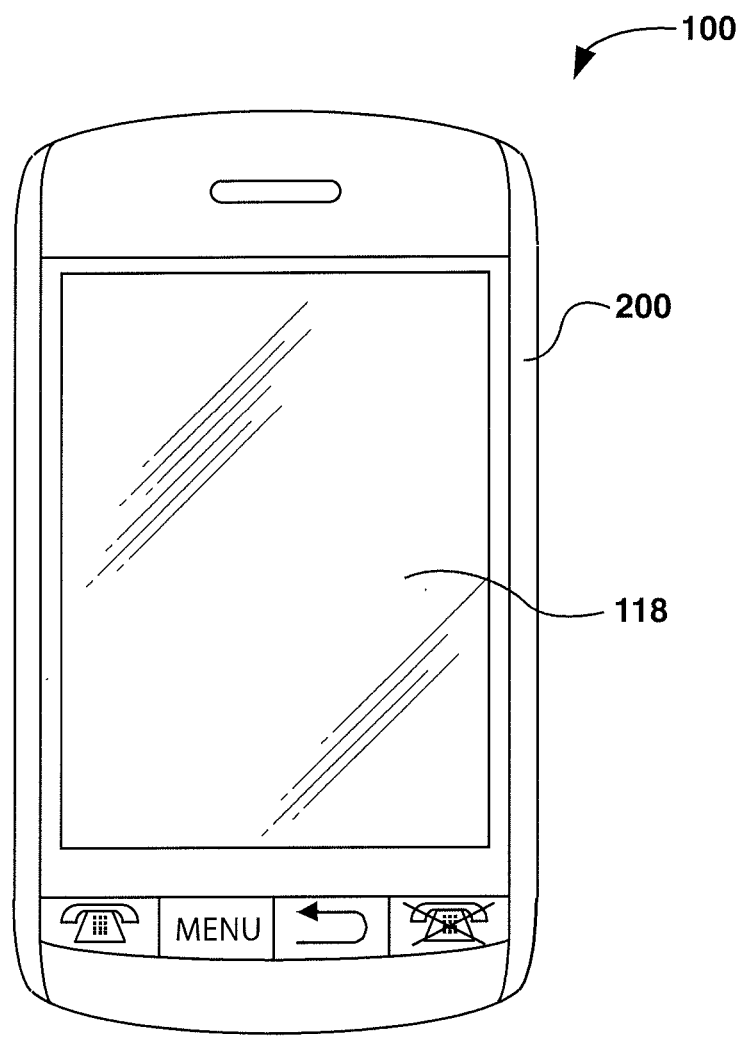
FIG. 2 is a front view of an example embodiment of a portable electronic device in a portrait orientation.

FIG. 2 shows a front view of an example of the portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 provides both an input device and output device for the portable electronic device 100. The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes the capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 3:
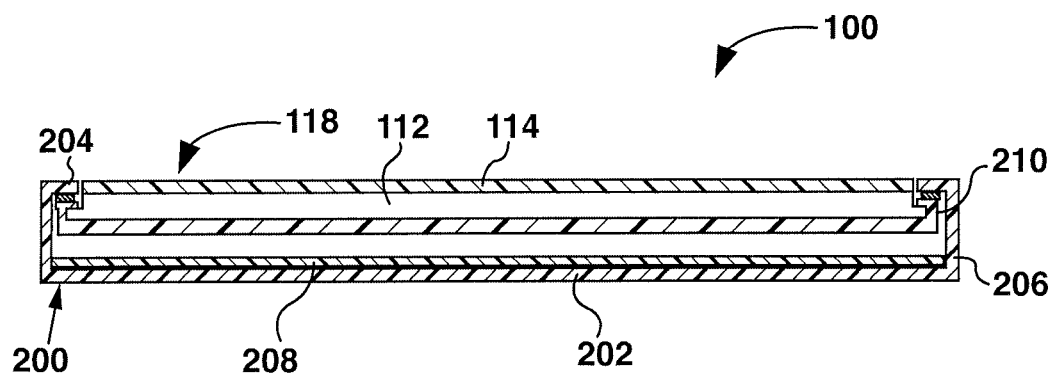
FIG. 3 is a sectional side view of portions of the portable electronic device of FIG. 2.

The housing 200 can be any suitable housing for the internal components shown in FIG. 1. FIG. 3 shows a sectional side view of portions of the portable electronic device 100. The housing 200 in the present example includes a back 202, a frame 204, which frames the touch-sensitive display 118 and sidewalls 206 that extend between and generally perpendicular to the back 202 and the frame 204. In the shown embodiment, the portable electronic device 100 includes a base 208 which is spaced apart from and is generally parallel to the back 202. The base 208 can be any suitable base. In at least some embodiments, the base 208 may include a circuit interconnect structure which could be, in some embodiments, a main circuit board 460 (FIG. 6) of the portable electronic device 100. The main circuit board 460 is typically a rigid printed circuit board (PCB), but may be a flexible PCB supported by a stiff support between the base 208 and the back 202, or a hybrid circuit structure comprising a flexible and rigid PCB. The back 202 may include a plate (not shown) that is releasably attached for insertion and removal of, for example, the power source 142 and the SIM/RUIM card 138 referred to above. It will be appreciated that the back 202, the sidewalls 206 and the frame 204 may be injection molded, for example. In the example of the portable electronic device 100 shown in FIG. 3, the frame 204 is generally rectangular with rounded corners, although other shapes are possible.

The display screen 112 and the touch-sensitive overlay 114 are supported on a chassis 210 (also known as a support frame or tray) for providing mechanical support to the display screen 112 and touch-sensitive overlay 114. The chassis 210 defines a cavity between its sidewalls for receiving electronics components such as the display screen 112 and touch-sensitive overlay 114. The received electronics are mounted directly or indirectly to the chassis 210. The chassis 210 is made from a suitable electrically conductive material which provides the mechanical support which forms a first ground plane for the portable electronic device 100. The first ground plane is used in controlling electrical impedances of one or more transmission lines of the portable electronic device 100, as described in more detail below. In some embodiments, the chassis 210 is made from a magnesium alloy, for example, via casting. In other embodiments, the chassis 210 is made from a suitable electrically conductive stainless steel alloy.

Figure 4A:
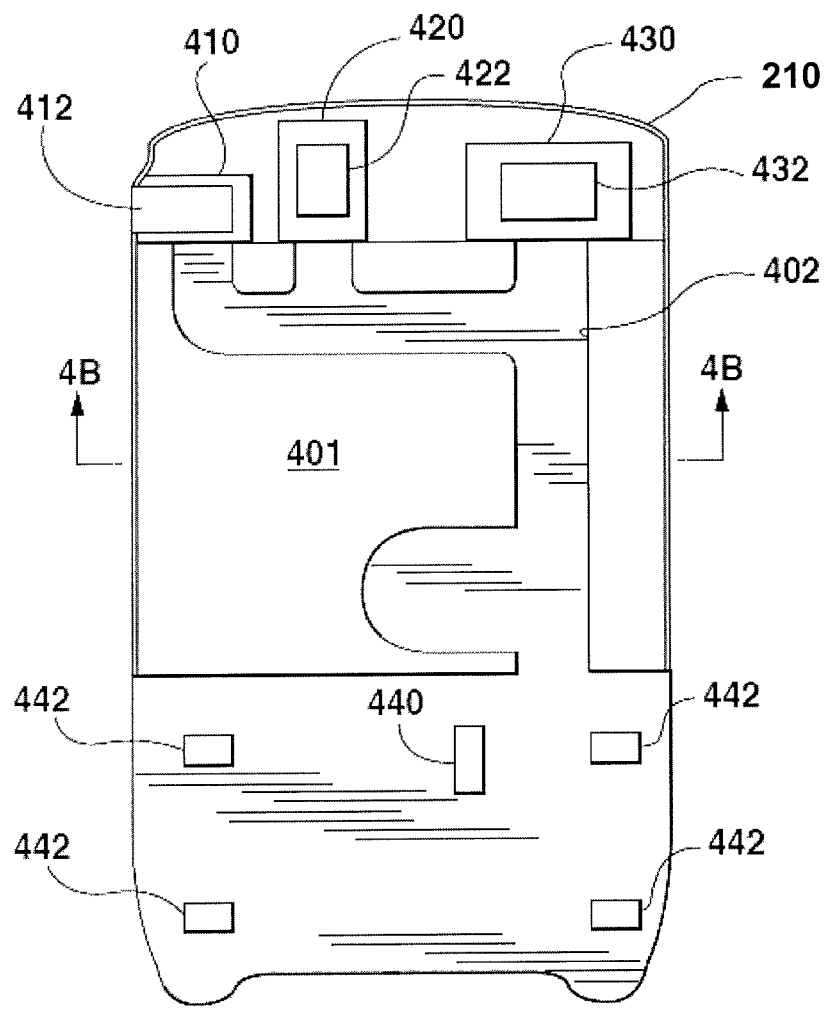
FIG. 4A is a front view of a chassis of the portable electronic device of FIG. 1 in accordance with one example embodiment.
Figure 4B:
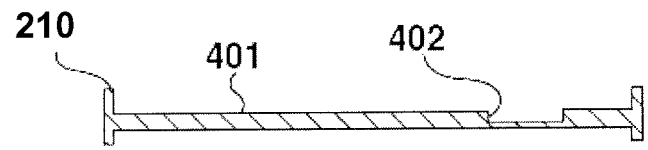
FIG. 4B is a sectional side view of the chassis of FIG. 4A taken along the line 4B-4B and in the direction indicated.

Referring now to FIG. 4A to 6, one example embodiment of the chassis 210 will be described. FIG. 4A is a front view of the chassis 210 and FIG. 4B is a sectional side view of the chassis 210. The chassis 210 has a front surface 401 in which a recess 402 is defined. In the shown embodiment, the recess 402 is generally elongate and defines a path extending between a top portion of the chassis 210 and a bottom portion of the chassis 210. However, the recess 402 may define a different path and shape in other embodiments.

In the shown embodiment, three circuit boards 410, 420 and 430 are mounted to the front surface 401 of the chassis 210 in its top portion. A different number of circuit boards may be provided in other embodiments. Moreover, the circuits could be mounted elsewhere in other embodiments, for example, on the bottom portion of the chassis 210 or on a side of the chassis 210. In some embodiments, the circuit boards 410, 420 and 430 are rigid printed circuit boards but could be any other suitable type of circuit interconnect structure. Each of the circuit boards 410, 420 and 430 has an electronic component mounted to it as indicated by references 412, 422, and 432 respectively. At least some of the electronic components 412, 422, and 432 may be relatively high speed components requiring relative high data transmission rates for exchanging data with the processor 102 of the the portable electronic device 100. Examples of high speed components which may comprise one or more of the electronic components 412, 422, and 432 are the digital camera 120, the touch-sensitive display 118 or an LCD screen (not shown), memory buses (not shown), or other electronic component having high speed signals with impedance matching requirements. One or more of the electronic components 412, 422, and 432 may not be high speed components, examples of non-high speed electronic components which may comprise one or more of the electronic components 412, 422, and 432 are an audio jack or port (not shown) for outputting audio data and bypassing the speaker 128 and the data port 126.

In the shown embodiment, supports 440, 442 are attached to the chassis 210 for supporting electronic components of the the portable electronic device 100 which are mounted directly or indirectly to chassis 210. In the shown embodiment, at least one first support 440 is attached to the chassis 210 for supporting a connector or interface for connecting data and/or power transmission lines connecting the electronic components 412, 422, and 432 to the main circuit board 460 (FIG. 6) of the portable electronic device 100. It will be understood that the electronic components 412, 422, and 432 are connected to the processor 120 of the portable electronic device 100 through the main circuit board 460. In the shown embodiment, the main circuit board 460 is not attached to the base 208 nor does it form part of the base 208 as in FIG. 2. In the shown embodiment of FIGS. 4A to 6, the base 208 may be omitted.

Figure 6:
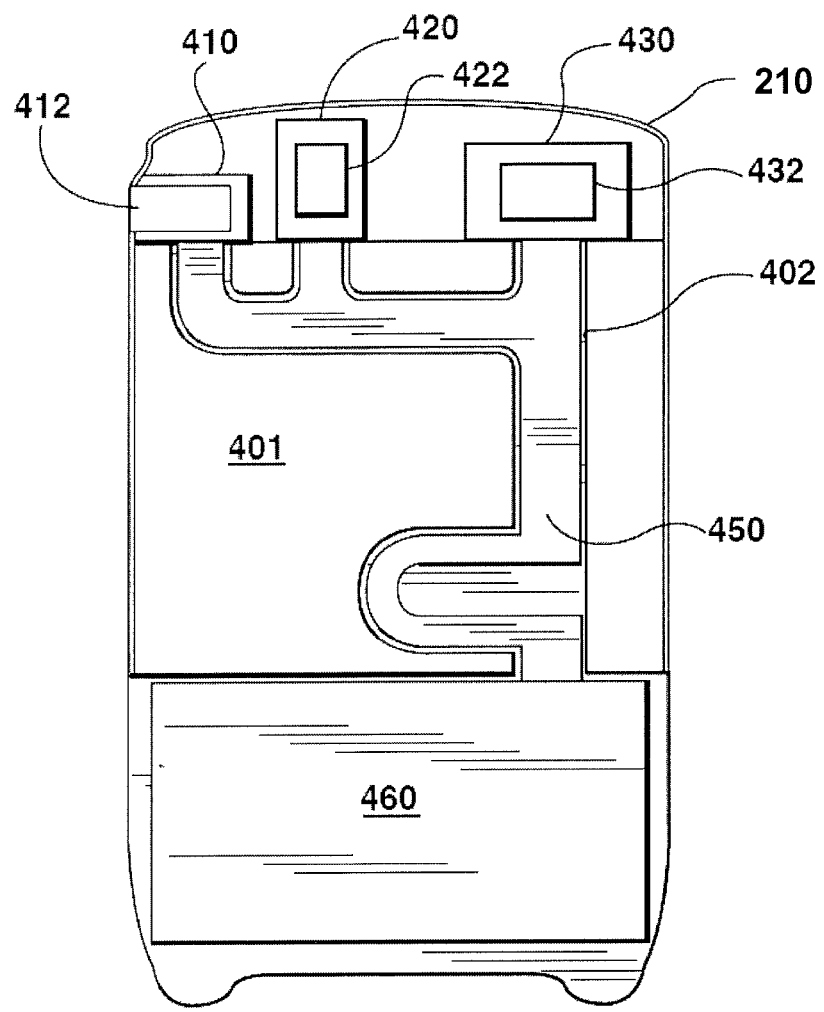
FIG. 6 is a front view of the chassis of FIG. 5A with a main circuit board attached to the flexible printed circuit board.

A plurality of second supports 442 are attached to the chassis 210 for supporting the main circuit board 460 (FIG. 6). The first support 440 may also indirectly support the main circuit board 460. In the shown embodiment, the first support 440 and second supports 442 are located within the recess 402 at the bottom portion of the chassis 210; however, the first support 440 and second supports 442 could be attached to the front surface 401 in other embodiments depending, for example, on the configuration of the recess 402. In at least some embodiments, the first support 440 and second supports 442 are foam supports.

Figure 5A:
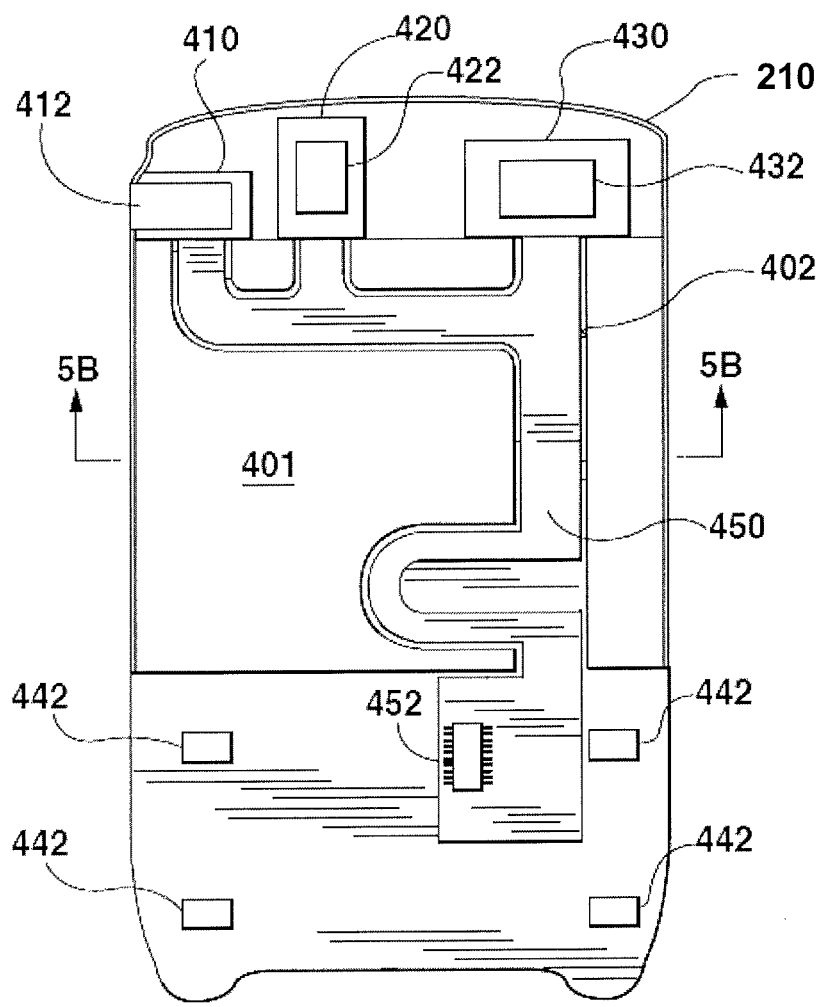
FIG. 5A is a front view of the chassis of FIG. 4A with a flexible printed circuit board mounted with a recess of the chassis.
Figure 5B:
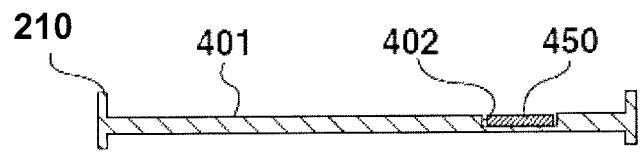
FIG. 5B is a sectional side view of the chassis of FIG. 5A taken along the line 5B-5B and in the direction indicated.

Referring to FIGS. 5A and 5B, a flexible printed circuit board (PCB) 450 which carries data and power transmission lines connecting the electronic components 412, 422, and 432 to the main circuit board 460 of the portable electronic device 100 is shown. In other embodiments, the flexible PCB 450 could be replaced with a rigid PCB. In other embodiments, the flexible PCB 450 may carry only data transmission lines or power transmission lines. The flexible PCB 450 is connected to the circuit boards 410, 420 and 430, typically using an interface connector 452 for connecting with a corresponding interface (not shown) on the main circuit board 460. The interface connector 452 is a suitable data interface, power interface, or data and power interface depending on the type of transmission line carried by the flexible PCB 450. FIG. 6 shows the chassis 210 with the main circuit board 460 connected to the interface connector 452 of the flexible PCB 450. Alternatively, the flexible PCB 450 could be connected to the circuit boards 410, 420 and 430 without an interface connector 452 using a conductive adhesive film or similar techniques for making a suitable electrical connection.

The flexible PCB 450 is received in the recess 402 in the chassis 210 as shown in FIGS. 5A and 5B. The recess 402 is typically sized so that a top surface of the flexible PCB 450 is flush with the front surface 401 of the chassis 210 or is located just below the front surface 401. The recess 402 is at least as deep as the flexible PCB 450 is thick. When a conductive adhesive or conductive film is used to electrically connect the flexible PCB 450 to the chassis 210, the depth of recess 402 should account for the thickness of the flexible PCB 450 and the conductive adhesive or conductive film. For example, in some embodiments the flexible PCB 450 is 0.2 to 0.4 mm in thickness and a 0.05 mm conductive adhesive or film is used. Accordingly, the recess 402 should be at least 0.25 to 0.45 mm in depth to allow for the flexible PCB 450 and conductive adhesive or film so that the top surface of the flexible PCB 450 is flush with the front surface 401 of the chassis 210 or is located just below it. The recess 402 reduces the overall thickness of the portable electronic device 100 and increases the volume of space available for electronics components to be received in the cavity defined by the chassis 210 and mounted thereto.

The recess 402 is at least the width of the flexible PCB 450 plus a predetermined mechanical tolerance; however, it may be wider in some areas. In the bottom portion of the chassis 210 where the first support 440 and second supports 442 are located, the recess 402 changes in shape from a track or channel which generally matches the shape of the flexible PCB 450 to an enlarged area which occupies substantially all of the bottom portion of the chassis 210. The main PCB 460 is mounted in this enlarged area in at least some embodiments. In other embodiments, the recess 402 may be omitted and the flexible PCB 450 attached directly to the front surface 401 of the chassis 210.

The flexible PCB 450 is typically mounted or attached to a bottom of the recess 402 using an electrically conductive adhesive. The electrically conductive adhesive may be an electrically conductive glue or paste applied to the bottom of recess 402 at some or all of the locations which are located adjacent to the flexible PCB 450, an electrically conductive pressure-sensitive adhesive (PSA) attached to the bottom of recess 402 at some or all of the locations which are located adjacent to the flexible PCB 450, or any other suitable electrically conductive adhesive. In other embodiments, a non-conductive adhesive may be used instead of an electrically conductive adhesive. In other embodiments, the flexible PCB 450 may secured to the chassis 210 using mechanical or other means and the adhesive may be omitted. The PSA, whether conductive or non-conductive, is typically 0.03 mm to 0.07 mm in thickness, and more typically 0.05 mm in thickness as noted above. The thickness ranges based between embodiments based on the particular design considerations and the particular PSA being used.

The above-described embodiments provide an electrical assembly having a rigid-flex printed circuit board in which the flexible PCB 450 connects to a rigid main printed circuit board 460 and rigid printed circuit boards 410, 420 and 430 through the flexible PCB 450. The rigid-flex printed circuit board is then attached to the conductive chassis 210 which acts as a ground plane for at least one transmission line of rigid-flex printed circuit board such as, for example, a transmission line of the flexible PCB 450. However, the teachings of the present disclosure can be applied to a flexible printed circuit board on its own, a rigid printed circuit board on its own, or discrete circuit interconnect structure requiring a ground plane. Moreover, as noted above, the flexible PCB 450 could be replaced with a rigid PCB. While operative, an electrical assembly created by the chassis 210, the main PCB 460 and a rigid PCB providing the connecting functions of the flexible PCB 450 may be thicker relative to described embodiment in which a flexible PCB 450 is used.

Figure 7A:
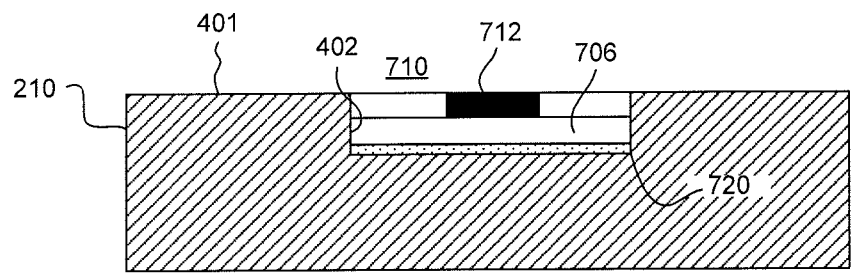
FIGS. 7A to 7C are sectional views of an electrical assembly in accordance with example embodiments of the present disclosure.
Figure 7B:
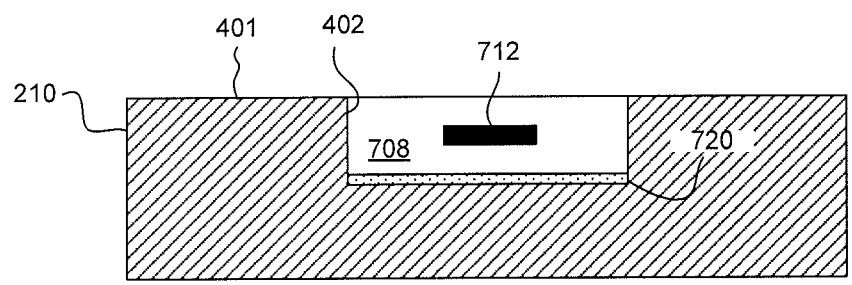
Figure 7C:
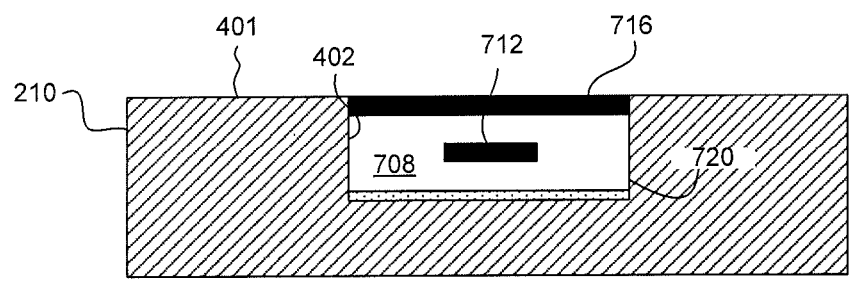

Referring now to FIGS. 7A to 7C, example embodiments of an electrical assembly in accordance with the present disclosure will be described. FIG. 7A shows a first embodiment of an electrical assembly. The electrical assembly comprises the grounded chassis 210 of the portable electronic device 100. As described above, the chassis 210 is made from a conductive material such as a conductive magnesium alloy which, for example, may be formed by casting. The conductive chassis 210 forms a first ground plane for the device. The chassis 210 is also used for mounting various electronic components such as the printed circuit boards 410, 420 and 430.

The electrical assembly further comprises a first dielectric layer 706, i.e., a non-conducting electrically insulating layer, overlaying the chassis 210. The first dielectric layer 706 is a dielectric substrate which may be made from suitable dielectric polymer such as, for example, a polyimide polymer. A first signal trace 712 overlays the first dielectric layer 706. A second dielectric layer 710 overlays the first signal trace 712. If no signal lines are located above the signal trace, the second dielectric layer 710 may be air rather than a dielectric substrate as in the shown embodiment. In other embodiments, the second dielectric layer 710 is dielectric substrate which may be made from a suitable dielectric polymer such as, for example, a polyimide polymer.

When the second dielectric layer 710 is a dielectric substrate, it may be the same or different from the dielectric substrate of the first dielectric layer 706. In at least some embodiments, the first dielectric layer 706, first signal trace 712 and second dielectric layer 710 are integrally formed as part of a circuit interconnect structure such as a flexible printed circuit board 450 (FIGS. 5A to 6). In such embodiments, the first dielectric layer 706 of the electrical assembly forms the bottom layer of the flexible PCB 450 and is attached to the chassis 210 typically within the recess 402 using a conductive adhesive 720. In other embodiments, the first dielectric layer 706 may be attached to the front surface 401 rather than within a recess 402, may be attached using a non-conductive adhesive, or may be secured to the chassis 210 using mechanical or other means and the adhesive 720 may be omitted. As noted above, the conductive layer may be an electrically conductive PSA, glue or paste.

When mounted to the conductive chassis 210, the electrical assembly of FIG. 7A creates a microstrip circuit in which the conductive chassis 210 acts a ground plane for the first signal trace of the microstrip circuit. This eliminates the lower ground layer that would be required using a conventional flexible PCB and eliminates the mechanical stack-up which would have been required had the first signal trace been an internal circuit layer of the flexible PCB 450.

FIG. 7B shows a second embodiment similar to that shown in FIG. 7A with the notable difference that the second dielectric layer 710 is combined/integrally formed with the first dielectric layer 706 to form a combined dielectric substrate layer 708 in which the first signal trace 712 is embedded. The combined dielectric substrate layer 708 not only overlays the first signal trace 712 but surrounds it. When mounted to the conductive chassis 210, the electrical assembly of FIG. 7B creates an embedded microstrip circuit in which the conductive chassis 210 acts a ground plane for the first signal trace of the embedded microstrip circuit.

FIG. 7C shows a third embodiment similar to that shown in FIG. 7B with the notable difference that a second ground plane 716 overlays the combined dielectric substrate 708. When mounted to the conductive chassis 210, the electrical assembly of FIG. 7C creates a stripline circuit in which the conductive chassis 210 acts a first ground plane for the first signal trace of the stripline circuit. Conductive vias (not shown) extend through the stripline circuit to connect the second ground plane to the chassis 210 and the first ground plane formed by it.

The present disclosure describes an electrical assembly which uses a grounded chassis as a ground layer for a circuit interconnect structure such as a flexible PCB. This allows one or more solid ground layers in the circuit interconnect structure to be eliminated depending on the type and configuration of the signal traces in the stack-up of the circuit interconnect structure. This allows the overall thickness of the circuit interconnect structure (e.g., flexible PCB) to be reduced while maintaining the required electrical parameters and ground reference.

Figure 8A:
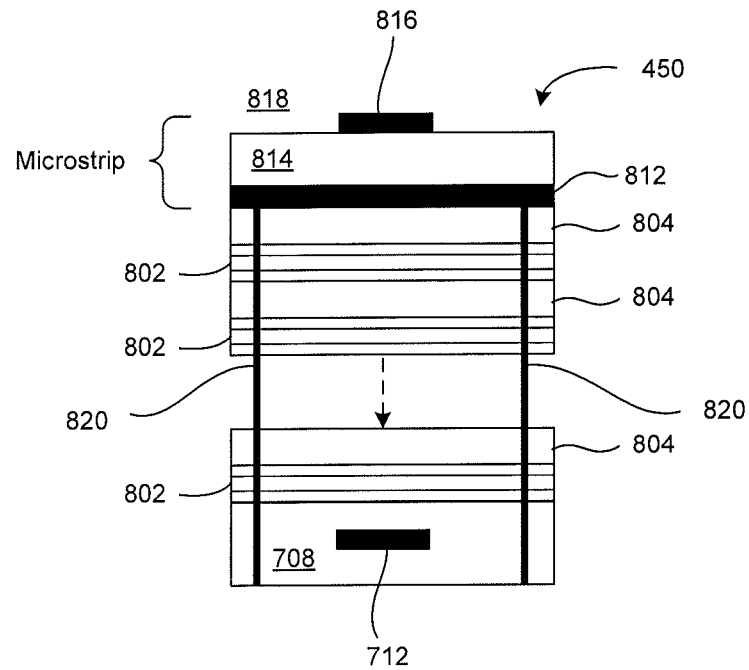
FIGS. 8A to 8C are sectional views of a flexible printed circuit board in accordance with example embodiments of the present disclosure.
Figure 8B:
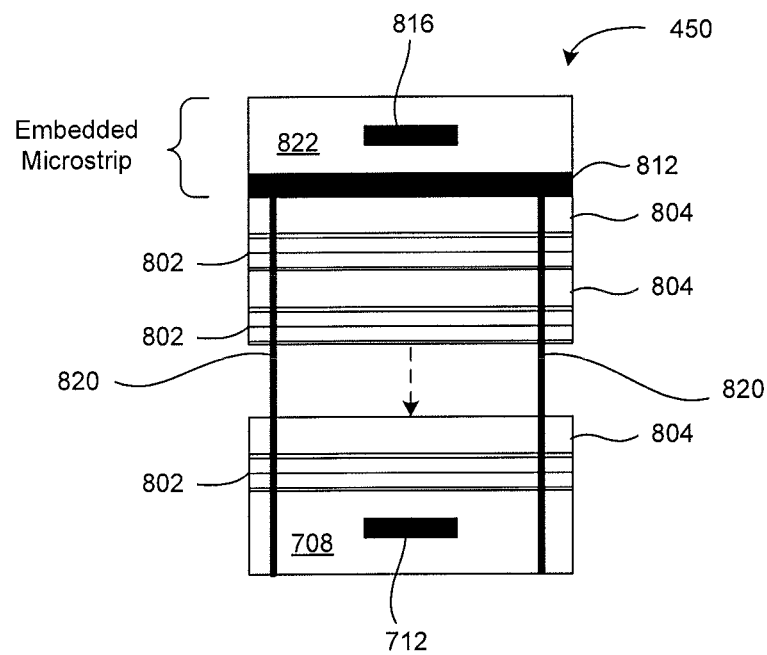
Figure 8C:
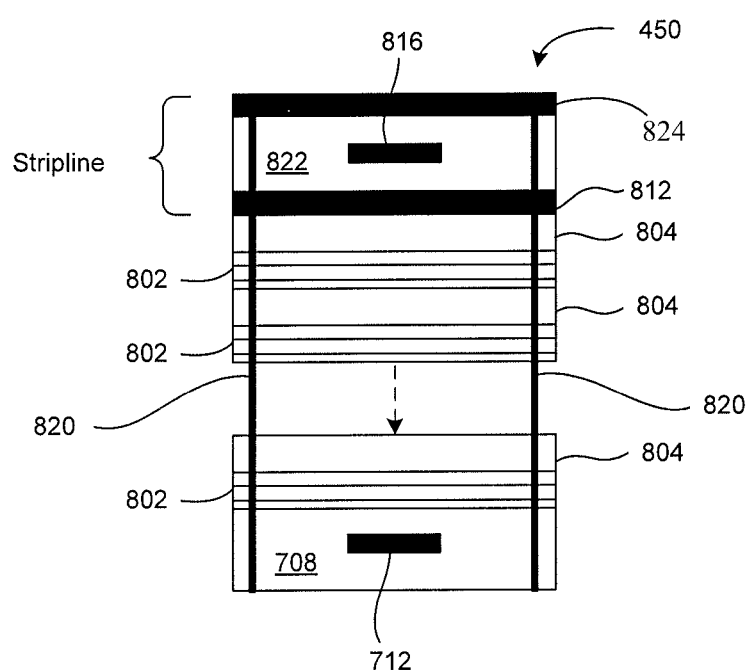

Referring now to FIGS. 8A to 8C, example embodiments of the flexible PCB 450 will be described. The flexible PCB 450 comprises one or more circuit layers, typically multiple circuit layers, each circuit layer being made up of several sub-layers and comprising one or more traces. In a typical flexible PCB 450 with multiple circuit layers, the first signal trace 712 of the electrical assembly of FIG. 7B or 7C is located in the bottom circuit layer. The additional circuit layers overlay the circuit layer having the first signal trace 712 using a mechanical stack-up configured for the multiple circuit layers of the flexible PCB 450. Each circuit layer in the flexible PCB 450 is typically separated by a spacer formed from a dielectric material. The flexible PCB 450 also has a protective covering or sheath (not shown) as is known in the art.

Examples of single circuit structures for a circuit layer which may be included in the flexible PCB 450 are microstrip, embedded microstrip, symmetrical stripline or asymmetrical stripline. Microstrip signal traces are useful in high-speed digital PCB designs where signals need to be routed from one part of the assembly to another with minimal distortion while reducing or minimizing high cross-talk between signal traces. Generally, stripline circuit structures achieve isolation between adjacent signal traces more easily than microstrip circuit structures. However, stripline circuit structures are generally harder and more expensive to fabricate than microstrip circuit structures.

For multi-circuit flexible PCBs, the outer layers of the flexible PCB 450 are typically microstrip circuit layers (referred to collectively as "M" layers) and the inner layers of the flexible PCB 450 are typically symmetrical stripline or asymmetrical stripline circuit layers (referred to collectively as "S" layers) sandwiched between the microstrip circuit layers. A multi-circuit stack-up requires the bottom microstrip circuit layer to be an embedded microstrip trace; however, the top layer microstrip circuit layer need not be an embedded microstrip trace. Thus, a typical multi-circuit stack-up for the flexible PCB 450 has a general top-to-bottom configuration of M-(S)$_n$-M where n is the number of stripline circuit layers in the middle of the flexible PCB 450. The number of stripline circuit layers is at least one, but a typical range is 3 to 7 stripline circuit layers, often 5 or 6 stripline circuit layers. As noted above, electronic component having high speed signals with impedance matching requirements such as the digital camera 120 are connected to one of the microstrip circuit layers which, in at least some embodiments, is the bottom layer which is electrically connected to the chassis 210. In some embodiments, the signal trace for more than one high speed component (e.g., the digital camera 120 and the touch-sensitive display 118 or LCD screen) may be located in the same circuit layer, for example, in a coupled embedded microstrip layer which makes up the bottom layer of the flexible PCB 450.

It is possible that the flexible PCB 450 could be configured to include other single circuit structures such as, for example, a surface coplanar waveguide trace and ground plane or embedded coplanar waveguide trace and ground plane in the flexible PCB 450. It is also possible that the flexible PCB 450 could be configured to include multiple circuit structure for a circuit layer such as, for example, edge-coupled microstrip, edge-coupled embedded microstrip, edge-coupled symmetrical stripline, edge-coupled asymmetrical stripline, broadside-coupled stripline and offset broadside-coupled stripline circuit structures. The construction of the above-mentioned circuit structures is well known in the art and will not be described in detail herein.

Each of the above-mentioned circuits includes at least one transmission line also known as a signal line. Each signal line is formed by a signal trace which comprises a conductive foil which has been appropriately patterned onto a dielectric substrate into a desired circuit pattern using, for example, conventional photolithography (or masking) and etching techniques. The conductive foil that forms the signal trace is the conductive material which remains after etching. The conductive foil is typically copper but could be another suitable conductive material. The flexible PCB 450 typically also comprises power and ground traces. The signal traces are usually narrower than power or ground traces because the current carrying requirements of signal traces are usually much less.

Each signal trace has a characteristic electrical impedance, referred to herein as simply impedance, which measures the opposition to a sinusoidal alternating current (AC) experienced by the signal trace. The impedance of the signal trace is affected by the circuit topology, the dielectric constant of the dielectric layer(s) surrounding it, the dielectric height of the respective circuit layer, the width of the signal trace, and the thickness of the signal trace. Proper control of the impedance of a signal trace may reduce noise and maintain signal integrity within predetermined tolerances, among other benefits.

FIG. 8A shows a first embodiment of the flexible PCB 450 in which the bottom circuit layer is an embedded microstrip signal trace as shown in FIG. 7B. Overlaying the bottom circuit layer are intermediate circuit layers 802 separated by spacers 804 formed for a suitable dielectric material. The top layer of the flexible PCB 450 in the embodiment of FIG. 8A is a microstrip comprising a second ground plane 812 which overlays the uppermost spacer 804, a third dielectric substrate layer 814 which overlays the second ground plane 812, and a second signal trace 816 which overlays the third dielectric substrate layer 814. The air surrounding the signal trace 816 acts as a fourth dielectric layer 818 as in microstrip signal trace of FIG. 7A. Multiple conductive vias 820 extend through the flexible PCB 450 and connect the ground planes of all of the circuit layers 802 to the conductive chassis 210. The conductive vias 820 are formed by holes through the flexible PCB 450 which are made conductive by electroplating and having a pad or contact on their exposed side of the flexible PCB 450 for contacting the chassis 210 and connecting the ground planes to the chassis 210. Alternatively, edge contacts of the flexible PCB 450 could be used for connecting the ground planes to the chassis 210.

FIG. 8B shows a second embodiment of the flexible PCB 450 similar to that shown in FIG. 8A with the notable difference that the top circuit layer is an embedded microstrip signal trace rather than an ordinary microstrip signal trace as in FIG. 8A. In the embodiment of FIG. 8B, the third dielectric layer 814 and fourth dielectric layer 818 of the first embodiment of FIG. 8A are combined/integrally formed to form a combined dielectric substrate layer 822 in which the second signal trace 816 is embedded. The combined dielectric substrate layer 822 not only overlays the second signal trace 816 but surrounds it.

FIG. 8C shows a third embodiment of the flexible PCB 450 similar to that shown in FIG. 8B with the notable difference that the top circuit layer is a stripline signal trace rather than an embedded microstrip signal trace as in FIG. 8B. In the embodiment of FIG. 8C, a ground layer 824 overlays the dielectric layer 822 and is connected to the conductive vias 820 connecting it to the chassis 210.

Figure 9A:
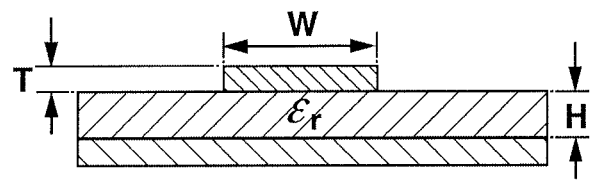
FIG. 9A is a schematic diagram of a microstrip circuit structure.
Figure 9B:
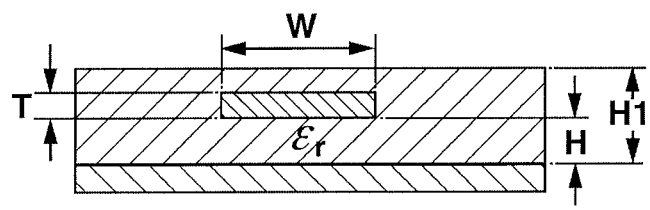
FIG. 9B is a schematic diagram of an embedded microstrip circuit structure.
Figure 9C:
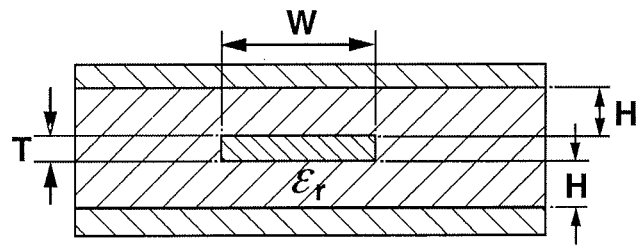
FIG. 9C is a schematic diagram of a stripline circuit structure.

Referring now to FIGS. 9A to 9C, the calculation of impedance for microstrip, embedded microstrip and stripline circuit structures will be briefly described. The equations mentioned below are derived by the Institute for Interconnecting and Packaging Electronic Circuits (IPC) and are further described in the Design Guide for Electronic Packaging Utilizing High-Speed Techniques ($4^{th}$ Working Draft, IPC-2251, February 2001) (hereinafter the "Design Guide"), which is incorporated herein by reference. Other equations may be used for calculation of impedance for microstrip, embedded microstrip and stripline circuit structures, or other circuit structures.

Due to the effect of the environment on the impedance of a signal trace, impedance can typically only be approximated based on the design equations of the Design Guide. When designing a printed circuit board for a particular application, an iterative process may be required in which a printed circuit is designed based on assumptions about its operating environment and a first prototype is prepared and tested in-situ to measure the characteristic impedance of its signal traces. The design is then modified to take into account environmental effects when the measured impedance is outside of predetermined tolerances. A further prototype is then prepared based on the modified design which is then tested in-situ, and the design is further modified if necessary. This process is repeated until the design is within predetermined tolerances.

FIG. 9A shows a schematic diagram of a microstrip circuit structure. An approximation of the impedance of a microstrip signal trace may be calculated in accordance with the following equation:

$$Z_0 = \frac{87}{\sqrt{\epsilon_r + 1.41}} \text{Ln}\left[\frac{5.98H}{(.8W + T)}\right]$$

where W is the signal trace width in millimeters (mm), T is signal trace thickness in mm, H is the height of signal trace in mm, $\epsilon_r$ is the relative permittivity of the dielectric (dimensionless) and $Z_o$ is the characteristic impedance in ohms ($\Omega$). The equation for calculating the impedance of an embedded microstrip signal trace provided above is typically valid for parameters specified in the Design Guide: 0.1<W/H<3.0; 1<$\epsilon_r$<15.

FIG. 9B shows a schematic diagram of an embedded microstrip signal trace. An approximation of the impedance of an embedded microstrip signal trace may be calculated in accordance with the following equation:

$$Z_0 = \frac{87}{\sqrt{\epsilon_Y + 1.41}} \ln\left(\frac{5.98H}{0.8W + T}\right) \times \left(1 - \frac{H_1 - T - H}{0.1}\right)$$

where W is the signal trace width in mm, T is signal trace thickness in mm, H is the height of signal trace in mm, $H_1$ is the height of the dielectric above the ground plane, $\epsilon_r$ is the relative permittivity of the dielectric (dimensionless) and $Z_o$ is the characteristic impedance in $\Omega$. The equation for calculating the impedance of an embedded microstrip signal trace provided above is typically valid for parameters specified in the Design Guide: 0.1<W/H<3.0; 1<$\epsilon_r$<15.

FIG. 9C is a schematic diagram of a symmetrical stripline signal trace. An approximation of the impedance of an embedded microstrip signal trace may be calculated in accordance with the following equation:

$$Z_0 = \frac{60}{\sqrt{\epsilon_r}} \times \ln\left(\frac{4 \times (2H + T)}{0.67\pi * (0.8W + T)}\right)$$

where W is the signal trace width in mm, T is signal trace thickness in mm, H is the height of signal trace in mm, $\epsilon_r$ is the relative permittivity of the dielectric (dimensionless) and $Z_o$ is the characteristic impedance in $\Omega$. The equation for calculating the impedance of a symmetrical stripline signal trace provided above is typically valid for parameters specified in the Design Guide: W/(H−T)<0.35; T/H<0.25; 1<$\epsilon_r$<15.

While the present disclosure describes example embodiments having a touch-sensitive display 118, it will be appreciated that the teachings of the present disclosure also apply to portable electronic devices which do not have a touch-sensitive display. Examples of other portable electronic devices in which the teachings of the present disclosure may be applied include those having a conventional, non-touch-sensitive display for a display (output) device (e.g., such as an LCD screen) and a keyboard or keypad as an input device. Moreover, the teachings of the present disclosure may be applied to portable and non-portable electronic devices having only an output device or only an input device.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A portable electronic device, comprising:
an electrical assembly, comprising: a chassis made from a conductive material and forming a first ground plane; a first dielectric substrate layer overlaying the chassis; a first signal trace overlaying the first dielectric substrate layer; and a second dielectric layer overlaying the first signal trace;
a main circuit board mounted to the chassis and including multiple connectors for connecting electronic components, the main circuit board being connected to the first signal trace;
a processor connected to the main circuit board;
at least one input device connected to the main circuit board and to the processor through the main circuit board; and
at least one output device connected to the main circuit board and to the processor through the main circuit board.

2. The device of claim 1, wherein the first signal trace and dielectric substrate layer are integrally formed as part of a flexible printed circuit board.

3. The device of claim 2, wherein the flexible printed circuit board comprises one or more stripline circuit layers overlaying the dielectric substrate layer, each stripline circuit layer comprising a pair of ground planes, a further dielectric substrate layer between the ground planes, a further signal trace embedded within the further dielectric substrate layer, and multiple conductive vias extending through the flexible printed circuit for connecting the ground planes of each circuit layer of flexible printed circuit board to the chassis; wherein all signal traces of the flexible printed circuit are connected to the main circuit board.

4. The device of claim 3, wherein the flexible printed circuit board further comprises at least one microstrip circuit layer overlaying the one or more stripline circuit layers, the microstrip circuit layer comprising a second ground plane, a third dielectric layer overlaying the second ground plane, a second signal trace overlaying the third dielectric layer, and a fourth dielectric layer overlaying the second signal trace.

5. The device of claim 4, wherein the chassis is made from a conductive magnesium or stainless steel alloy and the fourth dielectric layer is air.

6. The device of claim 1, wherein the chassis defines a recess, the main circuit board being received in the recess, wherein the main circuit board is attached to the chassis within the recess using a conductive adhesive.

7. The device of claim 1, further comprising an electronic component connected to the first signal trace, wherein the main circuit board has a stack-up configured to control the impedance of the first signal trace to within a predetermined tolerance of a predetermined impedance threshold.

8. The device of claim 1, wherein the first and second dielectric substrate layers are integrally formed to form a compound dielectric substrate layer in which the first signal trace is embedded, the electrical assembly further comprising a group layer within the compound dielectric substrate layer forming a second ground plane, and wherein the chassis forms multiple conductive vias connecting the first ground plane to the second ground plane.

9. The device of claim 2, wherein the chassis defines a recess, the flexible printed circuit board being received in the recess.

10. The device of claim 9, wherein the recess includes a first enlarged portion in a top portion of the chassis, a second enlarged portion in a bottom portion of the chassis, and a generally elongate portion which defines a path extending between the first large portion in the top portion of the chassis and the second enlarged portion in the bottom portion of the chassis.

11. The device of claim 10, further comprising at least one first rigid printed circuit board in the first enlarged portion in the top portion of the chassis and at least one second rigid printed circuit board in the second enlarged portion in the bottom portion of the chassis, wherein the flexible printed circuit board connects the at least one first rigid printed circuit board and the at least one second rigid printed circuit boards.

12. The device of claim 1, wherein the chassis is made from a conductive magnesium or stainless steel alloy.

13. The device of claim 2, further comprising an electronic component connected to the first signal trace, wherein the flexible printed circuit board has a stack-up configured to control the impedance of the first signal trace to within a predetermined tolerance of a predetermined impedance threshold.

* * * * *